H. D. PENNEY AND J. E. DAVIDSON.
ELECTRICAL NON-STOP CARD TABULATOR PRINTER.
APPLICATION FILED NOV. 6, 1917.

1,376,572. Patented May 3, 1921.
9 SHEETS—SHEET 5.

Fig. 5.

Witnesses:
Chas. G. Whiteman
Louis C. Badeau

Inventors:
Harold D. Penney,
Joshua E. Davidson,
By their Atty.

H. D. PENNEY AND J. E. DAVIDSON.
ELECTRICAL NON-STOP CARD TABULATOR PRINTER.
APPLICATION FILED NOV. 6, 1917.

1,376,572.

Patented May 3, 1921.
9 SHEETS—SHEET 9.

Witnesses:

Inventors:
Harold D. Penney,
Joshua E. Davidson,
By their Atty.

UNITED STATES PATENT OFFICE.

HAROLD D. PENNEY, OF PELHAM, AND JOSHUA E. DAVIDSON, OF NEW YORK, N. Y., ASSIGNORS TO POWERS ACCOUNTING MACHINE COMPANY, OF NEW YORK, N. Y., A CORPORATION OF DELAWARE.

ELECTRICAL NON-STOP CARD-TABULATOR PRINTER.

1,376,572.  Specification of Letters Patent.  Patented May 3, 1921.

Application filed November 6, 1917. Serial No. 200,516.

*To all whom it may concern:*

Be it known that we, HAROLD D. PENNEY, a citizen of the United States, residing at Pelham, New York, in the county of Westchester and State of New York, and JOSHUA E. DAVIDSON, a citizen of the United States, residing at New York city, N. Y., in the county of Bronx and State of New York, have invented certain new and useful Improvements in Electrical Non-Stop Card-Tabulator Printers, of which the following is a specification.

Our present invention relates to punched card operated accounting machines of the type described in the copending U. S. application of James Powers Serial No. 67,363, filed December 17, 1915. The machines of the present application and of said copending application contemplate obviating the use of the so-called stop card or total taking card, heretofore interposed between groups of cards fed together to the accounting machine, of which groups it was desired to take separate totals; and a brief description of the action of these machines would be about as follows:—

After placing a pile of cards in the feed magazine hopper of the tabulator printing machine, the machine is started operating thereon. The machine will first operate upon and add the items of the first group and on the completion of the first group sense the change of the designation of the groups, take and print the totals of the accumulated items, clear the machine and immediately start, without attention upon the next group, continuing in this manner until all of the groups have been separately totaled.

The present invention differs from that of the copending application in that electric means are provided for operatively connecting various mechanisms with each other, and for operatively connecting the card sensing and analyzing mechanisms with the accounting machine, whereby, the relative location of said machine and mechanism is not dependent upon the limitations of mechanical connections.

These and other objects and advantages of the invention will appear in the following description and it is noted that the invention is not limited to the details herein described, since these may be greatly varied without departing from the scope of the invention as claimed.

In the accompanying drawing showing by way of example, one of many possible embodiments of the invention.

The greater number of the features of construction of our present invention are shown and described in the said copending application and are hence fully described therein.

Referring more particularly to the annexed drawings. Our improved machine is shown comprising a main frame 10 on which is mounted a main drive shaft 11, from which is driven the accounting machine 12, by means of a connecting mechanism, generally indicated by reference numeral 14

Figure 1:
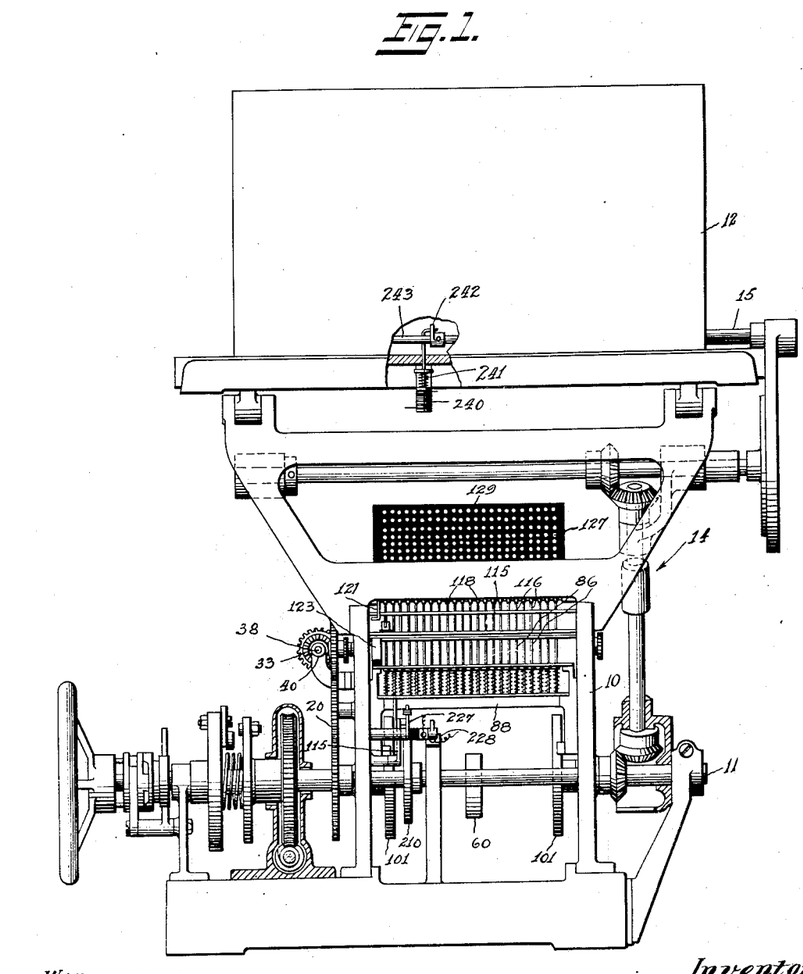
Figure 1, is a front elevation of our tabulator printing apparatus.
Figure 2:
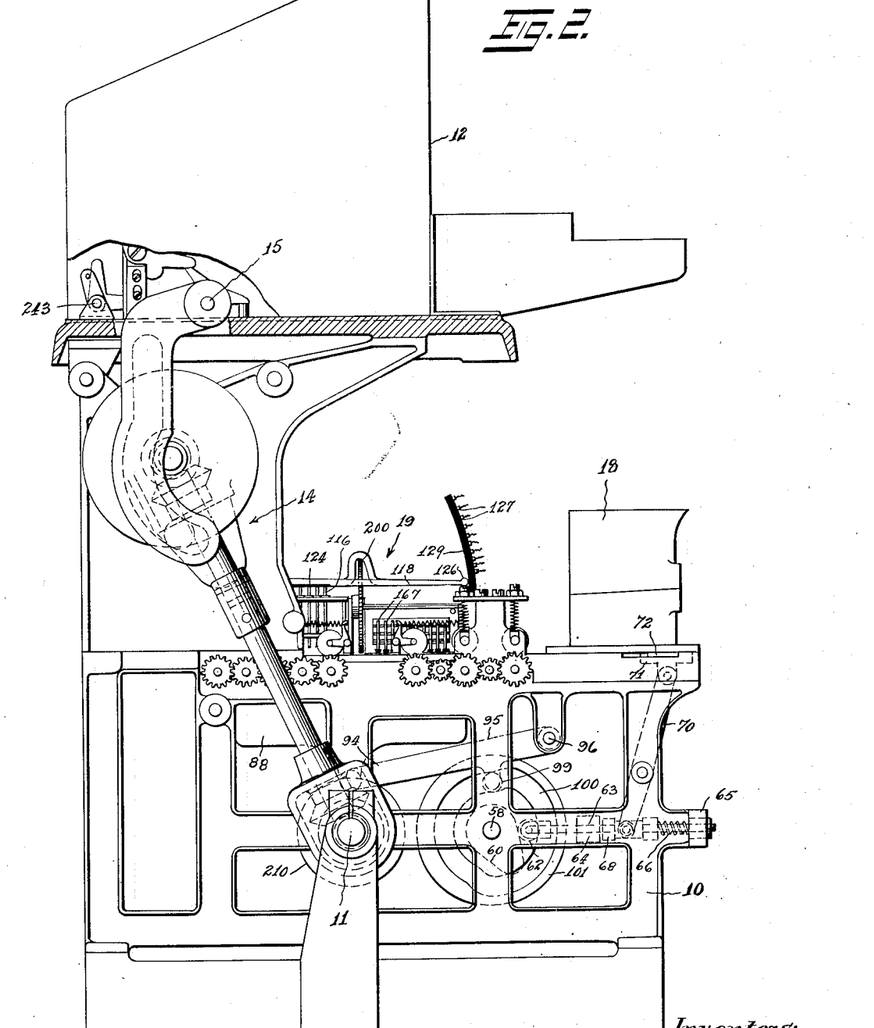
Fig. 2, is a side elevation of the same.

(Fig. 2) adapted to oscillate the main actuating shaft 15 of the adding machine.

The perforated cards (Fig. 11) which operate the apparatus are fed from the card hopper 18 (Fig. 2) to and from the analyzer comprising the analyzing and sensing mechanisms 19, where they are analyzed for operating the adding machine and sensed for detecting designation-changes in the cards.

The means for feeding cards from the magazine hopper to the card sensing means and thence to and from the card analyzing means will now be described.

Figure 5:
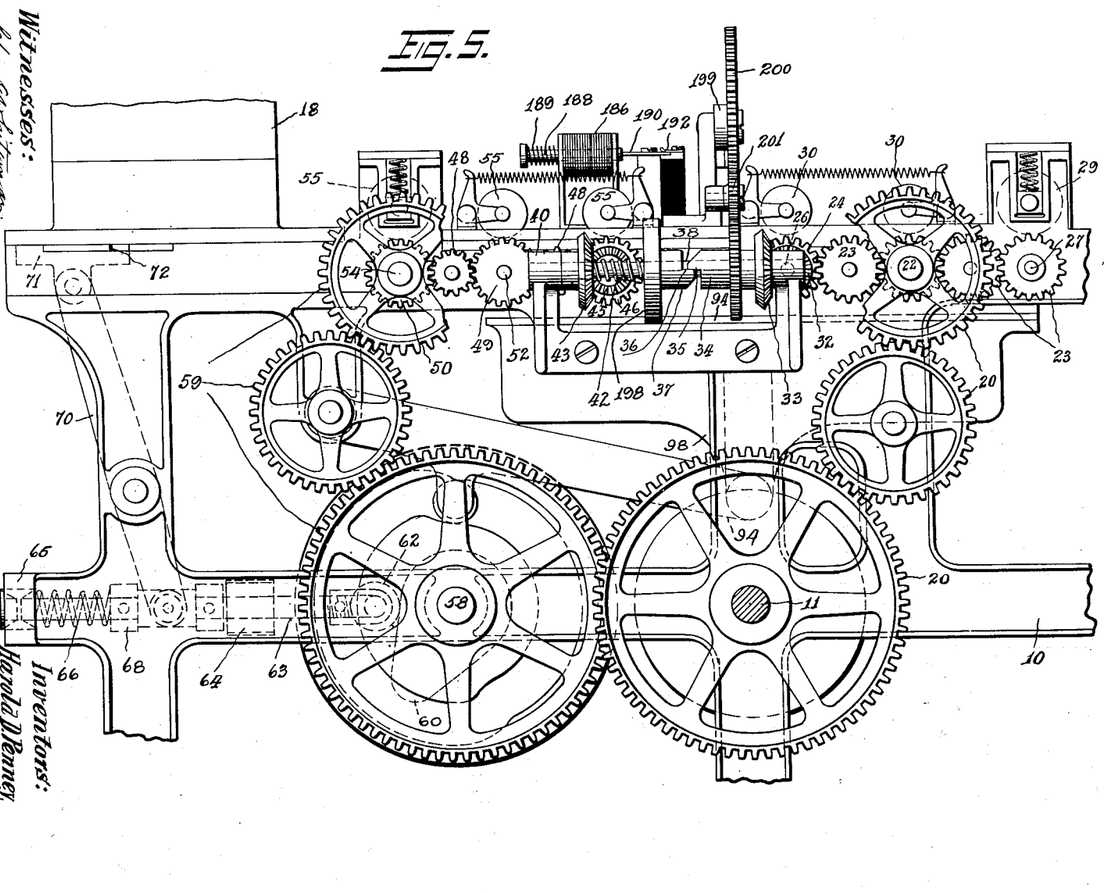
Fig. 5, is an enlarged fragmental side elevation showing the drive means for the feeding and discharge mechanism of the card analyzer.

From the main drive shaft 11, (Fig. 5) gear wheels 20, transmit motion to the discharge roller shaft 22, on which is mounted a discharge roller (not shown). By means of gears 23 and 24, motion is transmitted from the shaft 22 to discharge roller shafts 26 and 27, on which are carried discharge rollers (not shown), but which coöperate with spring-pressed rollers 29 and 30. The discharge rollers thus described, are of well known construction, and conduct the cards from the analyzing part of the card analyzer.

Figure 6:
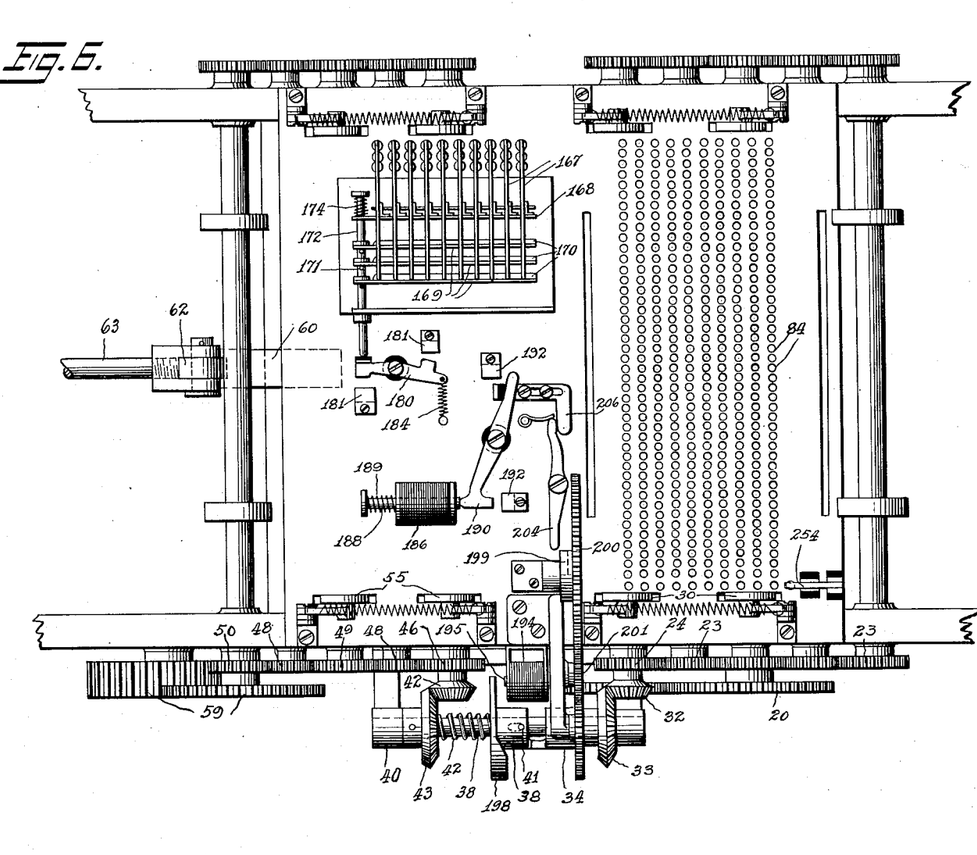
Fig. 6, is a fragmental plan, showing the mechanisms operating the card designation change sensing means and associated mechanisms for bringing about the taking of a total.

On the shaft 26, is mounted a beveled gear 32, which coöperates with a similar bevel gear 33, mounted on a clutch drive sleeve 34, provided with a drive face 35 coöperating with a drive shoulder 36 carried on a cam sleeve 37 slidable on a driven shaft 38 mounted in bearing brackets 40 carried on the frame of the machine. Said cam sleeve 37, is longitudinally slidable on said driven shaft, but is constrained to rotate therewith by means of a suitable arrangement for instance, as a pin 41 (Fig. 6) engaged in a coöperating slot; and said cam sleeve is slidably pressed toward said drive sleeve, by means of a spring (Fig. 5), interposed between said cam sleeve, and a beveled gear 43 fixed on said driven shaft and coöperating with a beveled gear 42 fixed to a spur gear 46 mounted upon the shaft of a feed roller (not shown). Said spur gear is operatively connected by means of pinions 48, and small gears 49 and 50, to feed roller shafts 52 and 54, carrying suitable feed rollers (not shown). Against said feed rollers are yieldably spring pressed coöperating feed rollers 55, all of which feed rollers serve to receive cards from the card hopper and convey them to the sensing part of the analyzer.

From said gear 50 and said shaft 54 the rotation is transmitted to the cam shaft 58 by means of intermeshing gears 59. Upon the cam shaft 58 is rigidly mounted a picker operating cam 60 adapted to engage a roller 62, carried upon the inner end of a rod 63, slidable in slide bearings 64 and 65, and spring pressed toward the cam 60, by means of the spring 66, strained between the bearing 65, and a collar 68, fixed on said rod 63, by which arrangement said rod is reciprocated as the shaft 58 and cam 60 are rotated.

Intermediately fulcrumed upon the frame of the machine is the picker lever 70, having its lower end pivotally engaging the collar 68, and its upper end pivotally connected to a sliding picker block 71 carrying a picker blade 72, adapted to pick the bottom card from a pile of cards in the hopper 18, and project said card through a micrometer slot of well known construction, (not shown) into engagement with the feed rollers nearest thereto.

It will be noted that the discharge rollers are continuously connected to and rotated by the main drive shaft, and that the feed rollers and the picker blade are driven from said main drive shaft, only when the clutch faces 35 and 36, are engaged with each other. When it is necessary to take a total, said faces 35 and 36 are disengaged by means operated from the sensing mechanism, as will be hereinafter described, whereby, the feeding of cards to or from the sensing mechanism is arrested, the discharge rollers continuing to operate to clear the analyzing part of cards, so that a total may be taken by the means hereinafter described. Now will be described the sensing and analyzing mechanism 19:—

Upon the frame of the machine, are mounted, in slightly spaced relation, upper and lower perforated analyzer plates 80 and 81 (Fig. 4), with a registering sensing pin perforations 82, and registering analyzing pin perforations 84, adapted to receive respectively the sensing pins 85, and the analyzing pins 86, carried in the pin box 88, and held yieldably pressed upwardly by springs 89, strained between the lower plate 90 of the pin box and small collars 92, carried on the pins, and limited in their upward movement by the upper plate 94 of the pin box.

The pin box is vertically reciprocated by means of levers 95, fulcrumed as at 96, to the frame of the machine and pivoted at its moving end 94 to ears 98 pending from the pin box, said levers being provided with intermediate rollers 99, engaging in cam grooves 100, in the cam wheel 101, mounted on the cam shaft 58, whereby on the rotation of said cam shaft and wheels, the pin box is reciprocated so as to cause the pins 85 and 86 to be moved upwardly into contact with the imperforate portion of a perforated card disposed between said plates 80 and 81, or through said holes 82 and 84 of the upper plate 80, should the pins not encounter such imperforate portion.

The cards are fed by the feed rollers into sensing position 105, between the plates 80 and 81 (Fig. 4), while the pin box is in lowered position; and the speed with which said rollers feed is so timed that the card is stopped in correct position to be sensed by the sensing pins, by the positioning plate 106, mounted upon the pin box, and vertically movable into the registering slots 107 of the plates 80 and 81. On the next downward movement of the pin box, the cards are moved by the feeding rollers into the analyzing position 108, the speed of said feeding being such that the cards are stopped at the upstroke of the pin box, by the positioning plate 109.

Now will be described the connection between the analyzing pins and the typed segment stop levers of the accumulating and printing mechanism of the accounting machine.

The holes 84 (Fig. 6), are arranged in rows of ten holes the rows being arranged side by side, and extending across the apparatus. Above said holes 84, there is a frame 115, provided with upper and lower spaced perforated plates in which are disposed rows of vertically movable rods 116, of varied length, each row of rods being disposed over a corresponding row of sensing pins 86. Above each row of said rods, is disposed a switch lever 118, pivoted at its lower end to a small shaft 119 mounted in insulated brackets 120 carried upon said frame. From said shaft there hangs a circuit closing contact piece 121, adapted to be contacted by the insulated circuit closing contact plate 123 carried upon the pin box for a purpose which will be explained.

Upon the lower face of each switch lever 118, there is provided an insulating strip 124, adapted to be contacted by the rods 116. The movable ends 126 of said switch levers are adapted to be moved by said rods into successive contact with contact pins 127 mounted in rows, one row for each switch lever in a segment 129 of insulating material mounted upon a bracket 130 carried upon the upper perforated plate 80, said pins 127 being so disposed and said rods 116 of such varied length, that for any analyzing pins 86 that are raised, the contact lever 118 of that row will be moved into contact with a definite contact pin 127, and be disposed in contact with such pin when the circuit closing contact plate 123 comes into contact with the contact piece 121.

Figure 3:
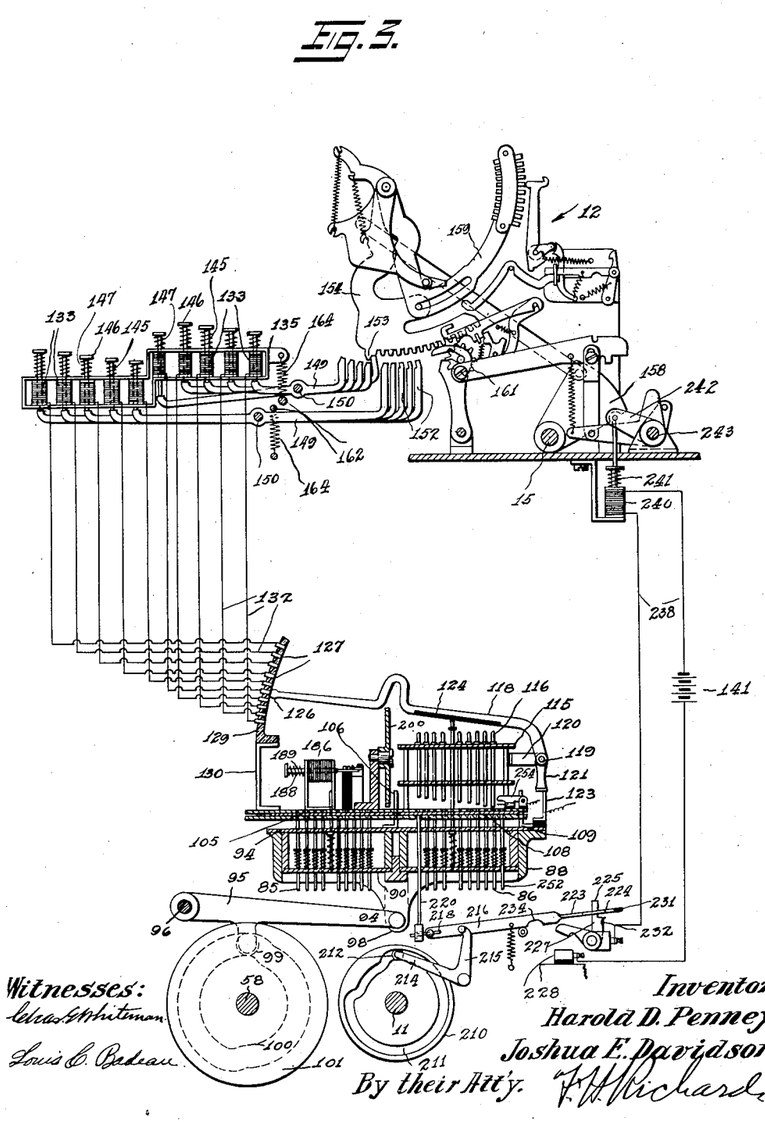
Fig. 3, is a side elevation, partly diagrammatic and partly in section, showing the operative relation between the card analyzer and the accumulator segment actuating and total taking mechanisms.
Figure 8:
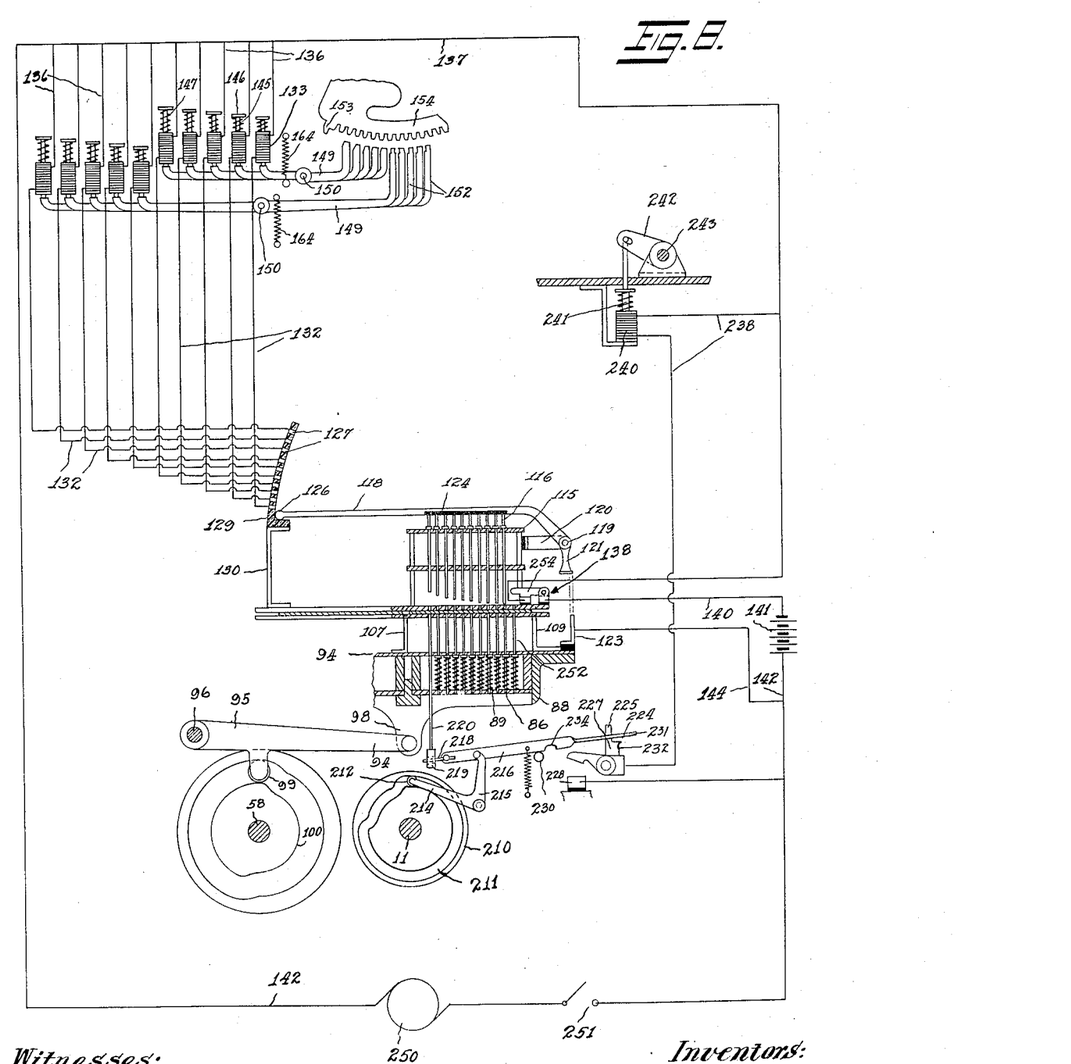
Fig. 8, is a diagrammatic view showing the relation between the card analyzer, the main drive means, the adding mechanism, and the total-taking mechanism.

Each contact pin 127 (Fig. 3), is connected by means of one of the conductors 132 with one of the solenoids 133 carried in frames 135 mounted on the frame of the adding machine. The other ends of said solenoids are connected by conductors 136 and 137 (Fig. 8) to one pole of the automatic stop switch 138, the other pole of which is connected by the conductor 140 to one terminal of a source current 141, the other terminal on said source being connected by conductors 142 and 144, to the circuit closing contact plate 123.

Partly within each solenoid 133, there is disposed a core pin 145 (Fig. 3) provided with a head 146, between which head and said frame 135 there is strained a spring 147 which normally holds the core pin in retracted position. Disposed beneath each core pin 145, is the outer end of a stop lever 149, each pivoted on one of the transverse shafts 150 and provided with an upturned end 152 adapted when raised to engage a stop 153 on one of the accumulator segments 154, said upturned ends being disposed in rows positioned under each accumulator segment, the individual upturned ends being arranged at various distances along the path of travel of said stops 153 in the well known manner.

From the foregoing it will be obvious that for any particular rod 116, that is raised the switch lever 118 will take a definite position and cause the upward movement of a definite upturned end 152 at the instant that the contact plate 123 closes the electric circuit. At this instant the main actuating shaft of the adding machine is operated causing the actuating sector 158 to move the accumulator segment 154 until the stop 153 engages the raised upturned end 152, thus positioning the type segment 159 and also the accumulator segment 154 in position to be engaged by the accumulator wheels 161 on the return stroke of the accumulator segment. The construction of the accumulating mechanism is well known, and will not be further described herein.

After the above operation takes place, the pin box is lowered and the circuit closing contact plate 123 breaks the circuit hereinbefore described, and deënergizes the solenoids permitting the stop levers 149 to be retracted by means of the universal bars 162 drawn toward said levers by means of the springs 164.

When the last card of any particular group has been fed into analyzing position 108, the card of the new group is fed into the sensing position 105. Mechanism is provided for sensing the change in designation which occurs at this group change. This mechanism will now be described.

Figure 11:
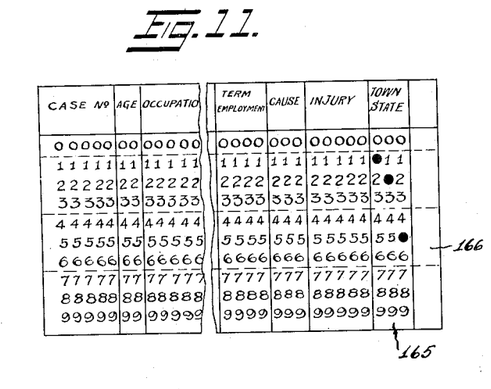
Fig. 11, is a face view of a card of the kind used for operating our improved apparatus.

The sensing mechanism is arranged to detect changes in the designations which represent record group changes, for instance the designations of the designation zone 165, of the record card 166, shown in Fig. 11. It is of course understood that cards for other purposes than the one shown could be used, and that the sensing mechanism need not be limited to any particular zone.

Figure 7:
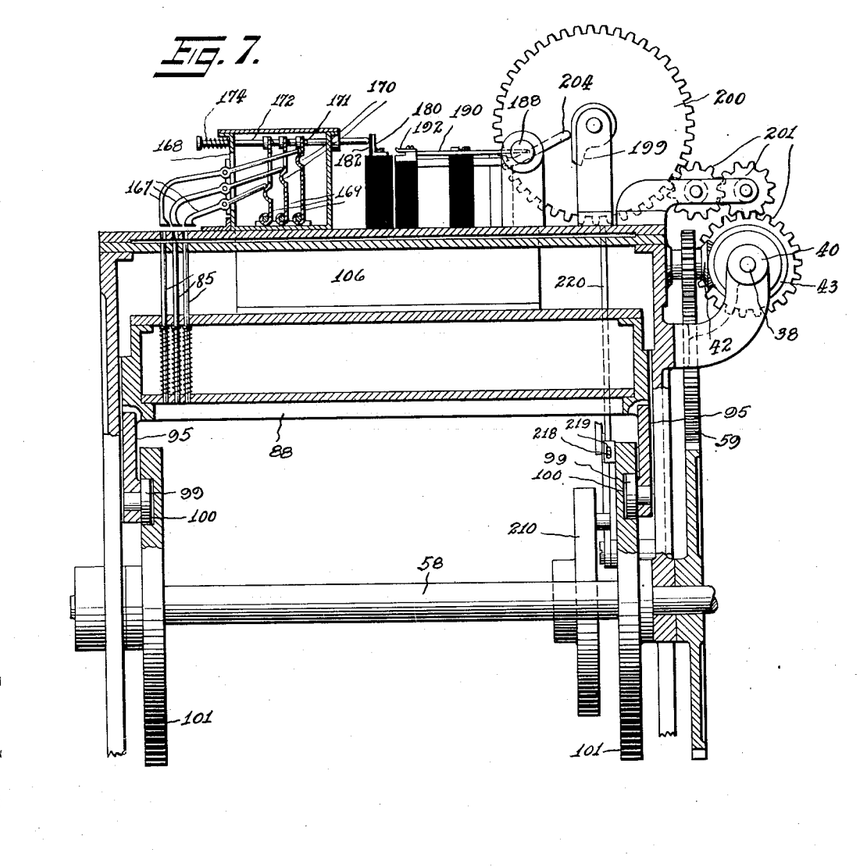
Fig. 7, is a fragmental transverse sectional view showing details of the designation-change sensing means.

The sensing pins 85, are arranged to register with the figures in said zone 165, and are in the present instance arranged in three rows of ten pins each. Above the pins 85 (Fig. 7), are disposed the flattened ends of sensing levers 167, each intermediately fulcrumed on a bracket frame 168, in which are disposed the rocking plates 169 fulcrumed at the lower edges and provided intermediately with a bend forming a beveled rib 170 adapted to be engaged by the upper ends of said sensing levers when said sensing levers are rocked as by the raising of a sensing pin 85 through the perforations in the zone 165. Said rocking plates are held in retracted position, against the sensing levers by means of transverse pins 171 carried on the push rod 172, which push rod is yieldably held in retracted position by means of the spring 174 strained between said bracket frame 168 and a head on the outer end of the push lever. It will thus be seen that whenever a sensing pin is raised through a perforation, the sensing lever rocked thereby engages said beveled rib and rocks a rocking plate, causing the rocking plate to push the push rod 172, thus permitting the end of the sensing lever to engage under the beveled rib, and be thus held in rocked position by the retractive movement of the rocking plate under the action of the spring 174. It will thus be seen that after a rocking lever has once been rocked by a pin, it will be held in rocked position, and will not again be rocked by the same pin until some other rocking lever, engaging the same rocking plate has been raised, thus causing such rocking plate to rock, and permitting the previously rocked sensing lever to resume its normal position.

Therefore, it will be seen that the first card of any record group will rock and set certain of the sensing levers and the rocking plate will not be again rocked, until some change takes place in the perforations of the designation zone of the record card. This change will only take place at the end of a record group, and therefore the rocking plates will be rocked and the push lever pushed only at the commencement of a new record group.

When the push rod 172 is pushed, as at the commencement of a new group of record cards, mechanism is actuated thereby which causes the unclutching of the members 34 and 37 (Fig. 5), which unclutching arrests the feeding of cards to the sensing position 105, but permits the continued operation of the discharged rollers to clear the analyzing portion of the analyzer of cards after the last card of the previous group has been analyzed and accumulated. This clearing of the analyzing part of cards, causes the automatic bringing about of the taking of the total just cleared. Mechanism for bringing about the operation of the clutch members 34 and 37 will now be described, after which mechanism for bringing about the taking of totals will be described.

Figure 9:
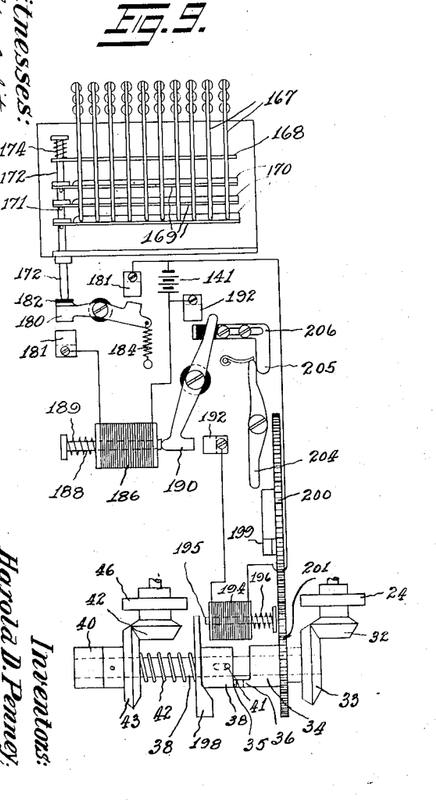
Fig. 9, is a diagrammatic plan, showing the connecting mechanism between the designation-change sensing means and the card feeding means.
Figure 10:
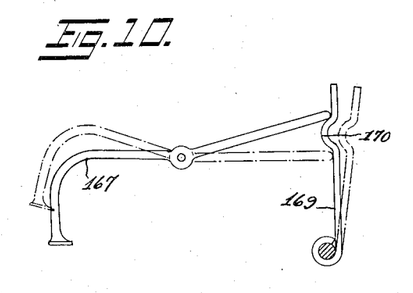
Fig. 10, shows a detail of the designation-change sensing means.

Disposed in front of the inner end of the push rod 172 (Fig. 9), is a relay switch lever 180 adapted to engage contacts 181 and provided with an insulating piece 182 adapted to be contacted by the push rod 172 to close the switch against the action of the spring 184. Connected in series circuit with the relay switch is a source of current 141 and a relay solenoid 186, said solenoid being adapted to be energized when said switch is closed, and to draw the core pin 188 against the action of the spring 189. Disposed in front of the inner end of the core pin 188, is a clutch controlling switch lever 190, adapted when pushed by said core pin to make contact with the contacts 192 of the clutch controlling switch. Connected in a series circuit with said clutch controlling switch, are the clutch controlling solenoid 194 and said source of current 141. Said switch lever 190, is frictionally held in closed or open position, and when closed by said pin 188 causes the energization of the solenoid 194 and the projecting therefrom of the clutch controlling pin 195 normally held in retracted position by the spring 196. When said pin 195 is projected it disposes itself in the path of the cam 198 of the cam sleeve 38; and, on the continued rotation of said cam sleeve long enough to permit the pin box to be lowered, said pin 195 engages the cam 198, causing the cam sleeve to be shifted and the faces 35 and 36 to be disengaged, thus arresting all movement of the feed rollers, the pin box, and the picker blade. After this arresting takes place, rotation of the discharge rollers and said drive sleeve 34 continues until the total has been taken of the previous group, at which time it is desired to retract the pin 195 to permit the drive faces 35 and 36 to again engage and cause the operation of the feeding means and the pin box to resume. This reëgagement is brought about by means of a clutch controlling cam 199 carried on the cam gear 200 adapted to be driven from intermediate gearing 201 to be driven from the drive sleeve 34. The gears 200 and 201 are so designed that the cam 199 rotates free of engagement until the total has been taken, at which time said cam engages the lever 204, and causes said lever to engage the hook end 205 of the frictionally yieldably held angled plate 206, engaging the switch lever 190, said engagement by the cam 199 causing said switch lever 190 to open, thus deënergizing the solenoid 194 and retracting the pin 195, permitting the drive faces of the clutch members to reëngage and cause the resumption of the operation of the feeding means and pin box, after which the normal operation of the apparatus continues.

Now will be described the means for automatically bringing about the taking of a total.

Figure 4:
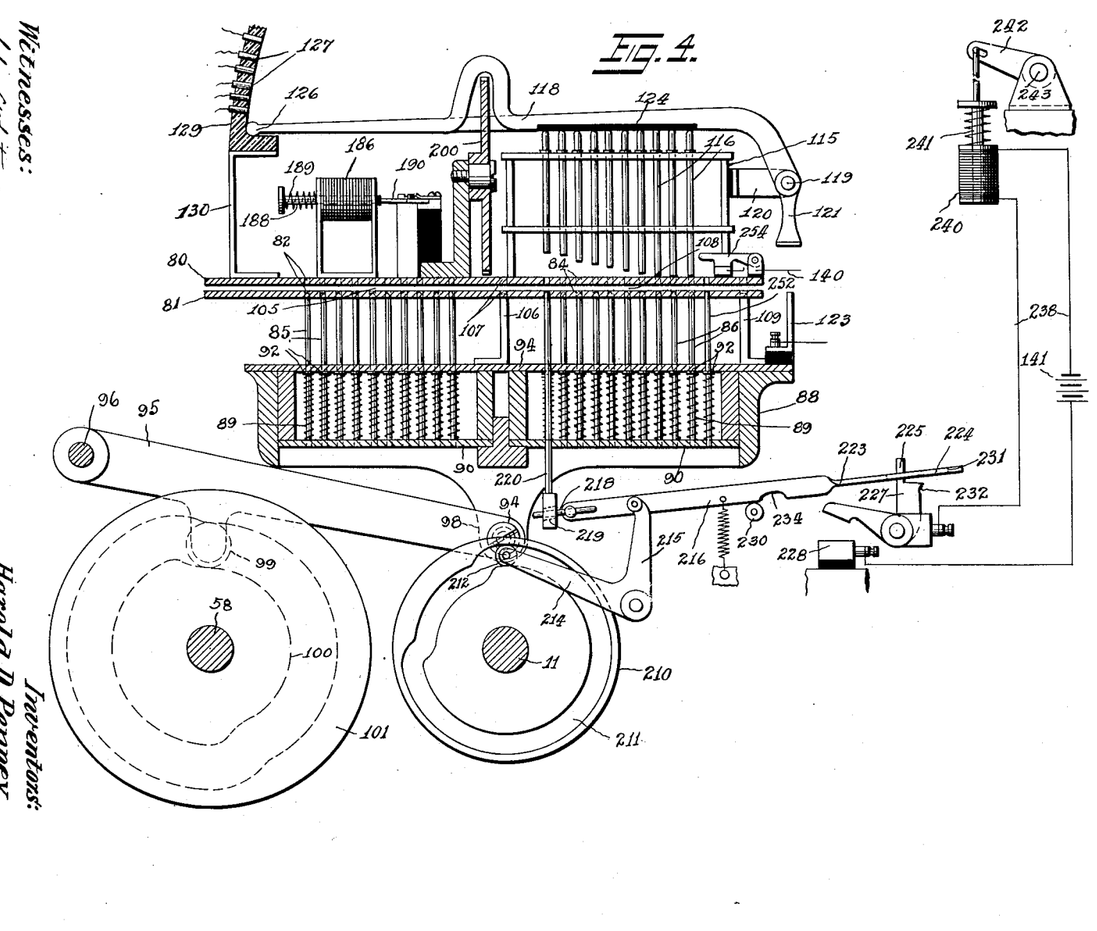
Fig. 4, is an enlarged sectional view partly in elevation, showing details of the card analyzer and the setting means for the total taking mechanism.

On the main drive shaft 11 Fig. 4, is disposed the total taking cam wheel 210, provided with a cam groove 211, in which engages a roller 212 carried on the end of the lower arm of a bell crank lever 214. Upon the free end of the upper arm 215 of said bell-crank, is pivotally mounted a horizontal bar 216 provided at its inner end with a reduced part 218 engaging in a perforation 219 in the lower end of the total taking pin 220 vertically slidable in perforations in the upper and lower plates 94 and 90 of the pin box, and a perforation in the lower analyzer plate 84. It is noted that the movement of the total taking pin is entirely independent of the movement of the pin box. The outer end of the bar 216, is provided with a flattened portion 223, provided with an eye 224 normally engaging over the diminished upper portion 225 of a pivotally mounted switch lever 227, adapted at its lower part to engage a contact block 228. Engaging under the intermediate portion of the bar 216, is a supporting roller 230 adapted normally to hold the shoulder 231, formed by said eye 224, above and out of engagement with a toe 232 formed on the upper arm of the switch lever 227. On each rotation of the cam wheel 210, the bell crank and the bar 216, are reciprocated by means of the cam groove, just at the instant that a card is normally in analyzing position 108. At the inward movement of the bar 216, the curve notch 234 at the lower edge of said bar is drawn over the roller 230, thus permitting the outer end of the bar 216 to be lowered and the pin 220 to be raised a slight extent until it comes in contact with an imperforate part of a card in the analyzing position 108, thus preventing the shoulder 231 from being lowered below and into engagement with the toe 232. Therefore, it will be seen that as long as there is a card in the analyzer at the instant of the inward movement of the total bar 216, there will be no operation of the switch lever 227; and there will be no closing of the circuit formed by said lever 227, said block 228, the conductors 238, the source of current 141, and the solenoid 240 for drawing downwardly the core pin 241 for actuating the crank 242 of the total taking shaft 243 of the usual total taking mechanism of the accounting machine.

If, however, the feeding mechanism should become arrested because of a record group change as has been explained, the last card of the previous group will be accumulated and then discharged from analyzing position, whereupon, upon the next reciprocation of the total taking bar 216, the notch 234 will ride down upon the roller, and the pin 220 will be raised and find no record card in the analyzing position, whereupon the downward movement of the notch upon the roller will continue until the shoulder 231 of the eye 224, will engage the toe 232; and continued inward movement of the bar 216 will cause the switch lever 227 to engage the contact block 228, thus closing the circuit energizing the solenoid 240, and causing the taking of a total. Before the next inward movement of the total taking bar 216, the cam 199 will have moved far enough to engage the lever 204 and cause the resumption of the operation of the feeding mechanism, and the first card of the next record group will be fed into the analyzing position 108 before the next upward movement of the pin 220, thus preventing a further taking of a total until the next record group change is reached.

Automatic means is provided for stopping the apparatus after the last record card of the last group has been accumulated. The main drive shaft 11 of the apparatus is suitably driven from a motor 250 diagrammatically illustrated in Fig. 8, and interposed in a conductor 142, connecting one pole of the source of current 141 to the conductor 137, thus forming the circuit comprising said source 141, said conductor 142, the motor 250, the main switch 251, the conductor 137, the stop switch 138, and the conductor 140. It will be remembered that when the analyzing part of the analyzer is clear of cards and a total is being taken, the pin box is in its lowered position. If on the next up-stroke of the pin box, there should be a card in the analyzing position, as will be the case if another card group is present to be analyzed, the stop pin 252 will engage an imperforate part of the card and thus be prevented from lifting the arm 254 of the stop switch 138. If however, there be no more record cards to be analyzed, on the next up-stroke of the pin box after the last total has been taken, there will be no card fed to the analyzing position, in which case the stop pin 252 will pass through the perforations of the plates 80 and 81, and engage and lift the switch arm 254, thus breaking the above mentioned circuit of which the motor 250 is a part, thus bringing the apparatus to rest before the circuit-closing contact plate 123 engages the plate 121.

The main switch 251 serves for at will stopping or starting the apparatus independently of the stop switch 138.

The operation of the apparatus will be understood from the foregoing, and need now be only briefly summarized as follows:—

The record cards having been arranged in groups in accordance with the designations of the zone 165, (Fig. 11), and placed in the hopper 18, the main switch 251 (Fig. 8) is closed and cards are fed to the sensing position 105 (Fig. 4), and on the first up-stroke of the pin box, the designation of said zone is sensed and the sensing levers are set so that there will be no further rocking of the sensing levers until the record group changes. During this operation of the first setting of the sensing levers, the core 189 (Fig. 9), is manually held in inoperative position, out of contact with the clutch controlling switch lever 190, so that there will be no arresting of the feeding mechanism or taking of a total at the beginning of this operation. After the operation of the machine is under way, the cards are one by one fed to the analyzing position 108 (Fig. 4) and analyzed, through the actuation of the solenoids 133 and the stop levers 149. After all of the cards of a group have been analyzed, a card of the next group is fed to the sensing position, bringing about a readjustment of the sensing levers, a rocking of the rocking plates, the unclutching of the clutching members 34 and 38, and the bringing of the feeding mechanism and the pin box to rest. While the feeding mechanism is at rest, the discharge mechanism continues its operation, clearing the analyzing part of the analyzer of cards, so that the next reciprocation of the bar 216 (Fig. 4) and upward movement of the total taking pin 220, the latter will find no card in the analyzing position and thus will permit the shoulder 231 to drop down and engage the toe 232, to rock the switch arm 227 and cause the actuation of the total taking mechanism.

After the total has been taken, continued movement of the cam 199 (Fig. 9) causes the opening of the clutch controlling switch and the release of the core pin 195, thus permitting the clutch members 34 and 38, to engage and cause the resumption of the operation of the feeding mechanism, thus causing a card to be fed to the analyzing position before the next reciprocation of the bar 216, if there are yet cards to be analyzed.

After the last record card of the last group has been analyzed and the reciprocation of the pin box resumed, as before explained, the pin 252 is raised into contact with the stop switch arm 254, thus breaking the main motor circuit and stopping the apparatus.

We claim as our invention:

1. In an apparatus of the character described, the combination with an accounting machine; an analyzer for analyzing devices having characteristic conformations; a movable member adapted to be moved by said analyzer; contacts all adapted to be contacted by the movable member; and electrical conductors and a source of electric current operatively connecting said contacts and movable member to said accounting machine.

2. In an apparatus of the character described, the combination with a machine having positioning members; an analyzer for analyzing devices having characteristic conformations; a movable member adapted to be moved by said analyzer in accordance with said conformations; a number of contacts all adapted to be contacted by the movable member; and electrical conductors and a source of electric current operatively connecting the contacts to said positioning members.

3. In an apparatus of the character described, the combination with an accounting machine having positioning members; an analyzer for analyzing devices having characteristic conformations; a movable switch member adapted to be moved by said analyzer; a row of contacts all adapted to be contacted by the switch member; and means for electrically connecting the contacts to said positioning members.

4. In an apparatus of the character described, the combination with an accounting machine having type positioning members; rows of analyzing members; a switch member associated with each of said rows and adapted to be moved by said analyzing members; rows of contacts adapted to be contacted by the switch members; electric operating means electrically connected to the respective contacts and adapted to actuate the respective positioning members; source of current having one terminal connected to said operating means; and means for electrically connecting the other terminal of said source to said switch members.

5. In an apparatus of the character described, the combination of an accounting machine having a total taking mechanism; an analyzer for transferring amounts to the machine; feeding mechanism for feeding articles to be analyzed to the analyzer; means for rendering the feeding mechanism and analyzer inoperative; and a feeling device adapted to feel for devices in the analyzer and, on finding none, to cause the total taking mechanism to take a total.

6. In an apparatus of the character described, the combination of an accounting machine having a total taking mechanism; a reciprocating card analyzer for transferring amounts to the machine; means controlled by the cards for arresting the reciprocating and thereby prevent amounts to be transferred to the machine; and a feeling device adapted to feel for cards in the analyzer and, on finding none, to cause the total taking mechanism to take a total.

7. In an apparatus of the character described, the combination of an accounting machine having a total taking mechanism; a card analyzer; feeding mechanism for feeding cards to the analyzer; means for reciprocating the analyzer; means controlled by the cards for rendering the feeding mechanism and reciprocating means inoperative; and a feeling device adapted to feel for cards in the analyzer and, on finding none, to cause the total taking mechanism to take a total.

8. In an apparatus of the character described, the combination of an accounting machine having a total taking mechanism; a sensing mechanism; an analyzer; feeding mechanism for feeding cards to the sensing mechanism and thence to the analyzer; means for reciprocating the analyzer; means controlled by the sensing mechanism for rendering the feeding mechanism and reciprocating means inoperative; discharge means for clearing the analyzer of cards; and a feeling device adapted to feel for cards in said analyzer and, on finding none, to cause the total taking mechanism to take a total.

9. In an apparatus of the character described, the combination of an accounting machine having a total taking mechanism; a pin box having a card sensing mechanism and an analyzer; said analyzer having an analyzing part; feeding mechanism for feeding cards to the sensing mechanism and thence to the analyzing part; means for reciprocating the pin box; means controlled by the sensing mechanism for rendering the feeding mechanism and reciprocating means inoperative; discharge means for clearing the analyzing part of cards; and a feeling device adapted to feel for cards in said analyzing part and to bring about the operation of the total taking mechanism when no card is found.

10. In an apparatus of the character described, the combination of an accounting machine having a total taking mechanism; a card holding device; a support; a reciprocating member yieldably held against said support and adapted thereby to mave in a certain path, and adapted to be held from said path by a card in said device; and electric means operated by said member when in said path for operating the total taking mechanism.

11. In an apparatus of the character described, the combination of an accounting machine having a total taking mechanism; a card holding device; a reciprocating member; a bar connected to said member and provided with a depression; a support for holding the bar in normal position except when the depression is associated with the support; means associated with said bar and adapted to engage a card in said device and hold the bar in normal position when the depression is not associated with said support; and means for operating the total taking mechanism and adapted to be operated by the bar when said device is clear of cards and said support enters the depression.

12. In an apparatus of the character described, the combination with an accounting machine, of a card analyzer comprising a card receiving part; means whereby the accounting machine is controlled from said analyzer; a source of power for the apparatus; a source of current; conductors connecting said sources; a switch interposed in one of said conductors; a bell crank, said switch having a movable contact mounted on said bell crank and a stationary contact, and a reciprocator adapted to feel in said receiving part and operatively connected to said bell crank to open said switch when the pin is reciprocated during the absence of a card in the receiving part.

13. In an apparatus of the character described, the combination with an accounting machine, of a card analyzer comprising a reciprocating part; means whereby the accounting machine is controlled from said analyzer; a main drive motor therefor; a source of current; conductors connecting said source to said motor; a switch interposed in one of said conductors; a bell crank, said switch having a movable contact mounted on said bell crank and a stationary contact, and a supplemental pin in said part operatively connected to said bell crank to open said main switch when the pin box is reciprocated during the absence of a card in the analyzer.

14. The combination, with an accounting machine, of electric means for controlling the accounting machine for registering items therein; a plurality of oscillating switches for directing current to said means; and a card analyzer for operating said switches in accordance with the card analyzed.

15. The combination, with an accounting machine having operating stop levers, of a solenoid for operating each stop lever; a plurality of analyzing pins; switch levers actuated by the analyzing pins; contacts contacted by the switch levers and electrically connected to the respective solenoids; a source of current; and means for connecting said source to said solenoids and said switch levers.

16. In an apparatus of the character described, the combination with an accounting machine having type segments and stop levers therefor; a pin box having analyzing pins; movable rods disposed in rows in register with said pins respectively; a switch lever associated with each of said rows and adapted to be moved by said rods; rows of contact pins adapted to be contacted by the ends of said levers when the switch levers are moved; solenoids electrically connected to the respective contact pins, and adapted to actuate the respective stop levers; a source of current having one terminal connected to said solenoids; and means for electrically connecting the other terminal of said source to said switch levers.

17. In an apparatus of the character described, the combination of an accounting machine; a card analyzing means connected therewith; a card sensing means; feeding mechanism for feeding cards to the sensing means and thence to the analyzing means; discharge means for the analyzing means; electrical means for rendering the drive mechanism inoperative after a change of designation occurs in the cards in the sensing means; means for causing the taking of a total when the analyzing means is cleared of cards; and delayed means for causing said electrical means to again cause the drive mechanism to become operative after the total is taken.

18. In an apparatus of the character described, the combination with an accounting machine, of a card analyzer having a sensing part and an analyzing part; a movable member; means for moving said member when a change in designation occurs in the cards in the sensing part; feeding mechanism for feeding cards to said sensing part and thence to the analyzing part; discharge means for the analyzing part; a drive mechanism for the feeding mechanism; electrical means comprising a switch closable by said movable member for rendering said drive mechanism inoperative; means for causing the taking of a total when the analyzer is cleared of cards; and means for automatically closing said switch.

19. In an apparatus of the character described, the combination with an accounting machine, of a card analyzer having a sensing part and an analyzing part, the latter operatively connected to the accounting machine; a movable member; means in said sensing part for moving said member whenever a change in designation of the cards is presented to the sensing part; a clutch controlling switch and a solenoid connected therewith; an electric relay operated by said member for closing said switch; feeding mechanism for feeding cards to the sensing part and thence to the analyzing part; discharge means for clearing the analyzing part of cards; drive means for driving the discharge means; drive mechanism for the feeding mechanism; a clutch interposed in said drive mechanism for rendering the latter inoperative when said switch is closed; means for causing the taking of a total when said analyzing part is cleared of cards; and means operated from said drive means for opening said switch after the total is taken for causing the resumption of the operation of the feeding means.

20. In an apparatus of the character described, the combination with an accounting machine having a total taking mechanism, of an analyzer operatively connected with said machine; mechanism for feeding cards to the analyzer; means for clearing the analyzer of cards; a reciprocating member; a bar pivoted to said member; means for holding the bar in normal position when there is a card in the analyzer; a switch adapted to be closed by the bar when the box is in abnormal position; and a solenoid controlled by the switch for causing the total taking mechanism to take a total.

21. In an apparatus of the character described, the combination with an accounting machine having a total taking mechanism, of an analyzer operatively connected with said machine; mechanism for feeding cards to the analyzer; means for arresting said feeding mechanism; means for clearing the analyzer of cards; a reciprocating member; a bar pivoted to said member; means for holding the bar in normal position when there is a card in the analyzer; a switch adapted to be closed by the bar when the bar is in abnormal position; and a solenoid controlled by the switch for causing the total taking mechanism to take a total.

22. In an apparatus of the character described, the combination with an accounting machine having a total taking mechanism, of an analyzer operatively connected to the accounting machine; feeding mechanism for feeding cards to the analyzer; means for rendering the feeding mechanism inoperative when it is desired to take a total; discharge means for clearing the analyzer of cards; a reciprocating member; a bar pivoted to said member and provided with an intermediate notch in its lower part and an operating shoulder; a support under said bar for holding the bar in normal position except when the notch is over the support; a pin secured to said bar and adapted to engage a card in the analyzer and hold the bar in normal position when the notch is over said support; a rocking piece adapted to be rocked by said shoulder when the bar is lowered to abnormal position; and electric means for operating the total taking mechanism when the rocking piece is rocked.

23. In an apparatus of the character described, the combination with an accounting machine having a total taking mechanism, of an analyzer operatively connected to the accounting machine; feeding mechanism for feeding cards to the analyzer; means for rendering the feeding mechanism inoperative when it is desired to take a total; discharge means for clearing the analyzer of cards; a reciprocating member; a bar pivoted to said member and provided with an intermediate notch in its lower part and an operating shoulder; a support under said bar for holding the bar in normal position except when the notch is over the support; a pin secured to said bar and adapted to engage a card in the analyzer and hold the bar in normal position when the notch is over said support; a rocking piece adapted to be rocked by said shoulder when the bar is lowered to abnormal position; and means for operating the total taking mechanism when the rocking piece is rocked.

24. In an apparatus of the character described, the combination with an accounting machine, of a card analyzer comprising a pin box having analyzing pins therein; means whereby the accounting machine is controlled from said analyzing pins; a main drive shaft; a motor therefor; a source of current; conductors connecting said source to said motor; a main switch interposed in one of said conductors; and a supplemental pin in the pin box adapted to open said main switch when the pin box is reciprocated during the absence of a card in the analyzer.

25. In an apparatus of the character described, the combination with an accounting machine having operating stop levers, of a solenoid for each stop lever; a card analyzer comprising a reciprocating pin box provided with a plurality of rows of analyzing pins and a supplemental pin; switch levers actuated by each row of analyzing pins; contacts contacted by the switch levers and electrically connected to the solenoids; a contact plate on the pin box and adapted to make electrical connection with said switch levers; a main drive shaft; a motor thereon; a source of current; conductors connecting said source to said motor and to said solenoids and said contact plate; and a main switch interposed in one of said conductors and adapted during the absence of a card in the analyzer, to open said main switch.

26. In an apparatus of the character described, the combination with an accounting machine having operating stop levers, of a solenoid for each stop lever; a card analyzer comprising a reciprocating pin box provided with a plurality of rows of analyzing pins and a supplemental pin; switch levers actuated by each row of analyzing pins; contacts contacted by the switch levers and electrically connected to the solenoids; a contact plate on the pin box and adapted to make electrical connection with said switch levers; a main drive shaft; a motor thereon; a source of current; conductors connecting said source to said motor and to said solenoids and said contact plate; and a main switch interposed in one of said conductors and adapted, during the absence of a card in the analyzer, to open said main switch before said contact plate makes connection with said switch levers.

27. The combination, with an accounting machine, of electric means for controlling the accounting machine for registering items therein; a plurality of oscillating switches for directing current to said means; and a card analyzer for operating said switches in accordance with the card analyzed.

28. The combination, with an accounting machine having operating stop levers, of an electric means for operating each stop lever; a plurality of analyzing pins; switch levers each adapted to be actuated by any one of several of the analyzing pins; contacts contacted by the switch levers and electrically connecting the respective electric means to a source of current; and means for connecting said source to said electric means and said switch levers.

29. In an apparatus of the character described, the combination, with an accounting machine having type segments and stop levers therefor, a pin box having analyzing pins; movable rods disposed in rows in register with said pins respectively; a switch lever associated with each of said rows and adapted to be moved by said rods; rows of contact pins adapted to be contacted by ends of said levers when the switch levers are moved; electric means electrically connected to the respective contact pins, and adapted to actuate the respective stop levers; a source of current having one terminal connected to said means; and means for electrically connecting the other terminal of said source to said switch levers.

30. In an apparatus of the character described, the combination of an accounting machine having a total taking mechanism; a reciprocating card analyzer for transferring amounts to the machine; means controlled by the cards for arresting the reciprocating analyzer and thereby preventing amounts to be transferred to the machine; and a feeling device adapted to feel for cards in the analyzer and, on finding none, to cause the total taking mechanism to take a total, and means for causing the resumption of operation of the reciprocating analyzer after the total is taken.

31. In an apparatus of the character described, the combination of an accounting machine having a total taking mechanism; a card analyzer; feeding mechanism for feeding cards to the analyzer; means for reciprocating the analyzer; means controlled by the cards for rendering the feeding mechanism and reciprocating means inoperative; a feeling device adapted to feel for cards in the analyzer and, on finding none, to cause the total taking mechanism to take a total, and means for causing the resumption of operation of the feeding mechanism and reciprocating means after the total is taken.

32. In an apparatus of the character described, the combination of an accounting machine, having a total taking mechanism, a card analyzer, means controlled by the cards for rendering the analyzer inoperative, means for causing the total taking mechanism to operate when said analyzer is rendered inoperative, and means for causing the resumption of operation of said analyzer after the total is taken.

33. In an apparatus of the character described, the combination of an accounting machine having a total taking mechanism, a card analyzer, card sensing means settable according to the designation of a group of cards, means controlled by the cards for rendering the analyzer inoperative whenever said sensing means is changed, means for causing the total taking mechanism to operate when said analyzer is rendered inoperative, and means for causing the resumption of operation of said analyzer and sensing means after a total is taken.

HAROLD D. PENNEY.
JOSHUA E. DAVIDSON.

Witnesses:
H. M. KILPATRICK,
H. I. SIEGEL.